(12) United States Patent
Jones et al.

(10) Patent No.: US 10,574,886 B2
(45) Date of Patent: Feb. 25, 2020

(54) GENERATING PANORAMIC VIDEO FOR VIDEO MANAGEMENT SYSTEMS

(71) Applicant: Thermal Imaging Radar, LLC, Orem, UT (US)

(72) Inventors: Lawrence Richard Jones, Mapleton, UT (US); Dana Rees, Orem, UT (US); David T. Kay, South Jordan, UT (US)

(73) Assignee: Thermal Imaging Radar, LLC, Orem, UT (US)

( * ) Notice: Subject to any disclaimer, the term of this patent is extended or adjusted under 35 U.S.C. 154(b) by 0 days.

(21) Appl. No.: 16/143,153

(22) Filed: Sep. 26, 2018

(65) Prior Publication Data

US 2019/0132512 A1 May 2, 2019

Related U.S. Application Data

(60) Provisional application No. 62/580,863, filed on Nov. 2, 2017, provisional application No. 62/633,278, filed
(Continued)

(51) Int. Cl.
*H04N 5/232* (2006.01)
*H04N 5/247* (2006.01)
(Continued)

(52) U.S. Cl.
CPC ..... *H04N 5/23238* (2013.01); *G06K 9/00711* (2013.01); *H04N 5/247* (2013.01);
(Continued)

(58) Field of Classification Search
CPC .... H04N 5/23238; H04N 5/225; H04N 5/247; H04N 7/181; G06K 9/00711; G06K 9/00771; G06K 2009/00738
See application file for complete search history.

(56) References Cited

U.S. PATENT DOCUMENTS

| | | |
|---|---|---|
| 3,336,810 A | 8/1967 | Schaffer et al. |
| 3,648,384 A | 3/1972 | Roberts |

(Continued)

FOREIGN PATENT DOCUMENTS

| | | |
|---|---|---|
| CN | 1254856 | 5/2000 |
| CN | 1485690 | 3/2004 |

(Continued)

OTHER PUBLICATIONS

Austin, David, "Generate Stepper-Motor Speed Profiles in Real Time," Dec. 30, 2004, 13 pages, Available at https://www.embedded.com/design/mcus-processors-and-socs/4006438/Generate-stepper-motor-speed-profiles-in-real-time.
(Continued)

*Primary Examiner* — Nathan J Flynn
*Assistant Examiner* — Tung T Trinh
(74) *Attorney, Agent, or Firm* — Workman Nydegger

(57) ABSTRACT

Generating panoramic video viewable at a third-party video management system includes receiving image data captured by at least one camera. The received image data may be captured at a plurality of angles (e.g., stop positions) arranged about a single axis (e.g., about which the camera rotates). The received image data may optionally be analyzed. Based on the received image data (and any optional analysis thereof), panoramic video derived from the captured image data (e.g., still images) may then be generated. A single video stream including the generated panoramic video may then be generated. The single generated video stream may then be sent to a third-party video management system (VMS). The video stream may be usable by the video management system for displaying the generated panoramic video. Various other views or other information may also be included in the single video stream sent to the VMS.

20 Claims, 8 Drawing Sheets

Related U.S. Application Data on Feb. 21, 2018, provisional application No. 62/657,561, filed on Apr. 13, 2018.

(51) Int. Cl.
*H04N 7/18* (2006.01)
*G06K 9/00* (2006.01)

(52) U.S. Cl.
CPC ......... *H04N 7/181* (2013.01); *G06K 9/00771* (2013.01); *G06K 2009/00738* (2013.01)

(56) References Cited

U.S. PATENT DOCUMENTS

| | | | |
|---|---|---|---|
| 3,769,501 A | 10/1973 | McDonough | |
| 3,883,788 A | 5/1975 | Storey, Jr. | |
| 4,263,513 A | 4/1981 | Palluet | |
| 4,465,959 A | 8/1984 | Yajima | |
| 4,602,857 A | 7/1986 | Woltz et al. | |
| 4,710,691 A | 12/1987 | Bergstrom | |
| 4,922,275 A | 5/1990 | Hughes | |
| 4,977,323 A | 12/1990 | Jehle | |
| 4,982,218 A | 1/1991 | Tsuboi et al. | |
| 4,988,938 A | 1/1991 | Yukihiro | |
| 5,453,618 A | 9/1995 | Sutton | |
| 5,598,207 A | 1/1997 | Kormos | |
| 5,650,813 A | 7/1997 | Gilblom | |
| D381,997 S | 8/1997 | Morooka | |
| 5,752,113 A | 5/1998 | Borden | |
| 5,790,183 A | 8/1998 | Kerbyson et al. | |
| 5,807,950 A | 9/1998 | Da Silva | |
| 5,990,941 A * | 11/1999 | Jackson | G06T 3/0062 348/207.99 |
| 6,023,588 A | 2/2000 | Ray | |
| 6,034,716 A | 3/2000 | Whiting | |
| 6,088,534 A | 7/2000 | Tominaga | |
| 6,133,943 A | 10/2000 | Needham | |
| D435,577 S | 12/2000 | McBride | |
| 6,195,204 B1 * | 2/2001 | Nalwa | G02B 27/1066 348/36 |
| 6,215,115 B1 | 4/2001 | Baker et al. | |
| 6,304,284 B1 | 10/2001 | Dunton | |
| 6,304,285 B1 * | 10/2001 | Geng | H04N 5/2259 348/36 |
| 6,388,414 B1 | 5/2002 | Kobayashi | |
| 6,539,162 B1 | 3/2003 | Stephenson | |
| D482,712 S | 11/2003 | Hsu | |
| 6,677,982 B1 | 1/2004 | Chen | |
| 6,678,001 B1 | 1/2004 | Elberbaum | |
| D486,847 S | 2/2004 | Uehara | |
| 6,731,799 B1 | 5/2004 | Sun | |
| 6,738,073 B2 | 5/2004 | Park et al. | |
| 6,738,569 B1 | 5/2004 | Sogabe | |
| 6,809,887 B1 | 10/2004 | Gao | |
| 6,948,402 B1 | 9/2005 | Amendolea | |
| 6,991,384 B1 | 1/2006 | Davis | |
| 6,992,722 B2 | 1/2006 | Jung | |
| D520,548 S | 5/2006 | Tsai | |
| 7,088,907 B1 | 8/2006 | Nishijima | |
| 7,126,630 B1 * | 10/2006 | Lee | H04N 5/225 348/218.1 |
| D543,644 S | 5/2007 | Bembridge | |
| 7,324,135 B2 | 1/2008 | Ouchi et al. | |
| 7,381,952 B2 | 6/2008 | Teich et al. | |
| 7,423,272 B2 | 9/2008 | Hasegawa et al. | |
| 7,436,438 B2 * | 10/2008 | Sim | G06T 3/4038 348/218.1 |
| 7,525,567 B2 | 4/2009 | McCutchen | |
| 7,561,187 B2 | 7/2009 | Umezaki | |
| 7,732,771 B2 | 6/2010 | Hasegawa et al. | |
| D640,721 S | 6/2011 | Satine | |
| 7,991,575 B2 | 8/2011 | Vogel et al. | |
| 8,106,936 B2 | 1/2012 | Strzempko et al. | |
| 8,194,912 B2 | 6/2012 | Kitaura et al. | |
| 8,285,512 B2 | 10/2012 | Vogel et al. | |
| D673,988 S | 1/2013 | Riegl | |
| 8,355,042 B2 | 1/2013 | Lablans | |
| 8,594,483 B2 | 11/2013 | Koyanagi | |
| D695,809 S | 12/2013 | Katori | |
| 8,773,503 B2 | 7/2014 | Dortch et al. | |
| D728,655 S | 5/2015 | Daniel | |
| D741,388 S | 10/2015 | Register | |
| 9,348,196 B1 | 5/2016 | Dortch | |
| 9,363,569 B1 * | 6/2016 | van Hoff | G06Q 30/0263 |
| 9,390,604 B2 * | 7/2016 | Dortch | G08B 17/125 |
| 9,516,208 B2 | 12/2016 | Dortch et al. | |
| D776,181 S | 1/2017 | Dortch et al. | |
| 9,685,896 B2 | 6/2017 | Dortch et al. | |
| 9,742,996 B1 * | 8/2017 | Martin | H04N 5/23238 |
| 9,886,776 B2 * | 2/2018 | Dortch | H04N 5/33 |
| 2001/0026684 A1 | 10/2001 | Sorek et al. | |
| 2001/0027456 A1 | 10/2001 | Lancaster et al. | |
| 2001/0043264 A1 * | 11/2001 | Sinclair | H04N 5/2252 348/36 |
| 2002/0025023 A1 | 2/2002 | Herold et al. | |
| 2002/0184017 A1 | 12/2002 | Lee et al. | |
| 2002/0185926 A1 | 12/2002 | King | |
| 2003/0025599 A1 | 2/2003 | Monroe | |
| 2003/0071891 A1 * | 4/2003 | Geng | H04N 5/2259 348/39 |
| 2003/0160863 A1 * | 8/2003 | Kakou | G08B 13/19602 348/46 |
| 2003/0174056 A1 | 9/2003 | Harshaw | |
| 2003/0197785 A1 | 10/2003 | White | |
| 2004/0017470 A1 * | 1/2004 | Hama | G08B 13/19626 348/42 |
| 2004/0075741 A1 | 4/2004 | Berkey et al. | |
| 2004/0155558 A1 | 8/2004 | Cuttino | |
| 2004/0179098 A1 | 9/2004 | Haehn | |
| 2004/0183941 A1 | 9/2004 | McCutchen | |
| 2004/0233274 A1 * | 11/2004 | Uyttendaele | H04N 5/23238 348/36 |
| 2004/0257026 A1 | 12/2004 | Rogers | |
| 2005/0041100 A1 * | 2/2005 | Maguire, Jr. | G06F 3/011 348/121 |
| 2005/0152447 A1 | 7/2005 | Jouppi | |
| 2005/0207487 A1 * | 9/2005 | Monroe | G08B 13/19628 375/240.01 |
| 2005/0261820 A1 | 11/2005 | Feeney | |
| 2005/0285953 A1 * | 12/2005 | Hasegawa | G08B 13/19608 348/239 |
| 2006/0056056 A1 * | 3/2006 | Ahiska | G08B 13/19608 359/690 |
| 2006/0179463 A1 | 8/2006 | Chisholm | |
| 2006/0268112 A1 * | 11/2006 | Ikeda | G06T 11/60 348/169 |
| 2007/0025723 A1 * | 2/2007 | Baudisch | G03B 13/02 396/287 |
| 2007/0061735 A1 | 3/2007 | Hoffberg | |
| 2007/0115527 A1 | 5/2007 | Lee | |
| 2008/0106593 A1 | 5/2008 | Arfvidsson et al. | |
| 2008/0159732 A1 | 7/2008 | Young | |
| 2008/0267477 A1 | 10/2008 | Conti | |
| 2009/0051310 A1 | 2/2009 | Chandhoke | |
| 2009/0066796 A1 | 3/2009 | Karasyuk et al. | |
| 2009/0087096 A1 * | 4/2009 | Eaton | G06K 9/38 382/190 |
| 2009/0309966 A1 | 12/2009 | Chen et al. | |
| 2010/0020310 A1 | 1/2010 | Merklein | |
| 2010/0026809 A1 * | 2/2010 | Curry | H04N 5/222 348/157 |
| 2010/0091089 A1 | 4/2010 | Cromwell et al. | |
| 2010/0097444 A1 | 4/2010 | Lablans | |
| 2010/0142757 A1 | 6/2010 | Sandstrom et al. | |
| 2010/0208032 A1 * | 8/2010 | Kweon | G03B 37/00 348/36 |
| 2010/0303289 A1 | 12/2010 | Polzin et al. | |
| 2011/0055696 A1 * | 3/2011 | Dollar | G06F 3/0482 715/702 |
| 2011/0058036 A1 | 3/2011 | Metzger | |
| 2011/0174762 A1 | 7/2011 | Tsai | |
| 2011/0220797 A1 | 9/2011 | Hoelter et al. | |
| 2011/0293180 A1 | 12/2011 | Criminisi | |

(56) References Cited

U.S. PATENT DOCUMENTS

| | | |
|---|---|---|
| 2011/0293247 A1 | 12/2011 | Bhagavathy |
| 2011/0316970 A1 | 12/2011 | Cheong |
| 2012/0051588 A1 | 3/2012 | McEldowney |
| 2012/0127169 A1 | 5/2012 | Barcay et al. |
| 2012/0127284 A1* | 5/2012 | Bar-Zeev ............. G02B 27/017 348/53 |
| 2012/0133639 A1 | 5/2012 | Kopf et al. |
| 2012/0155744 A1 | 6/2012 | Kennedy |
| 2012/0176401 A1 | 7/2012 | Hayward |
| 2012/0194564 A1 | 8/2012 | White et al. |
| 2012/0206565 A1* | 8/2012 | Villmer ................... H04N 1/00 348/36 |
| 2012/0293334 A1 | 11/2012 | Yu |
| 2012/0299920 A1 | 11/2012 | Coombe et al. |
| 2012/0300019 A1* | 11/2012 | Yang ................. H04N 5/23232 348/36 |
| 2012/0314066 A1 | 12/2012 | Lee et al. |
| 2012/0320148 A1 | 12/2012 | Unger |
| 2013/0002807 A1 | 1/2013 | Vogel et al. |
| 2013/0009588 A1 | 1/2013 | Kazutoshi |
| 2013/0030699 A1 | 1/2013 | Barnes et al. |
| 2013/0044108 A1* | 2/2013 | Tanaka ................... G06T 15/04 345/419 |
| 2013/0048855 A1 | 2/2013 | Abreo |
| 2013/0050260 A1* | 2/2013 | Reitan ..................... G06F 3/011 345/633 |
| 2013/0079955 A1 | 3/2013 | Masiello et al. |
| 2013/0103303 A1 | 4/2013 | Lynch |
| 2013/0113827 A1 | 5/2013 | Forutanpour et al. |
| 2013/0155229 A1 | 6/2013 | Thornton et al. |
| 2013/0162867 A1 | 6/2013 | Gupta |
| 2013/0176130 A1 | 7/2013 | Hoesl |
| 2013/0182897 A1* | 7/2013 | Holz .................. G06K 9/00711 382/103 |
| 2013/0188010 A1* | 7/2013 | Dortch ............... H04N 5/23238 348/37 |
| 2013/0249947 A1 | 9/2013 | Reitan |
| 2014/0028712 A1 | 1/2014 | Keating et al. |
| 2014/0176565 A1 | 6/2014 | Adeyoola et al. |
| 2014/0192184 A1 | 7/2014 | Wu |
| 2014/0282275 A1 | 9/2014 | Everitt et al. |
| 2014/0333776 A1* | 11/2014 | Dedeoglu ............... H04N 7/181 348/159 |
| 2015/0062337 A1 | 3/2015 | Scalisi |
| 2015/0116741 A1 | 4/2015 | Ogino |
| 2015/0161779 A1* | 6/2015 | Hamann ................... H04N 5/33 348/165 |
| 2015/0365607 A1 | 12/2015 | Yang |
| 2016/0005435 A1* | 1/2016 | Campbell ............... H04N 9/806 386/240 |
| 2016/0021295 A1 | 1/2016 | Krestyannikov |
| 2016/0088287 A1* | 3/2016 | Sadi ..................... H04N 13/254 348/43 |
| 2016/0105609 A1* | 4/2016 | Pettegrew ................ G06T 7/80 348/37 |
| 2016/0225159 A1 | 8/2016 | Sato |
| 2016/0266380 A1 | 9/2016 | Dortch |
| 2016/0321779 A1* | 11/2016 | Fujita ..................... G06T 3/0018 |
| 2017/0024898 A1 | 1/2017 | Spector et al. |
| 2017/0124622 A1* | 5/2017 | Kliper ................ G06Q 30/0625 |
| 2017/0223368 A1* | 8/2017 | Abbas .................. H04N 19/146 |
| 2017/0236300 A1 | 8/2017 | Dortch et al. |
| 2018/0286075 A1 | 10/2018 | Dortch |
| 2018/0307352 A1* | 10/2018 | Stimm ..................... G06F 3/048 |

FOREIGN PATENT DOCUMENTS

| | | |
|---|---|---|
| CN | 1639751 | 7/2005 |
| CN | 102176270 | 9/2011 |
| CN | 102280005 | 12/2011 |
| CN | 102868345 | 4/2015 |
| EP | 2492883 | 8/2012 |
| GB | 2433127 | 6/2007 |
| JP | 2000236461 | 8/2000 |
| JP | 2003123157 | 4/2003 |
| JP | 2006013832 | 1/2006 |
| JP | 2006333133 | 12/2006 |
| JP | 2007271869 | 10/2007 |
| JP | 2008236632 | 10/2008 |
| JP | 2011199750 | 10/2011 |
| JP | 2011239195 | 11/2011 |
| JP | 2012065273 | 3/2012 |
| JP | 2012113204 | 6/2012 |
| KR | 10-2009-0067762 | 6/2009 |
| RU | 2012140240 | 9/2012 |
| TW | 401687 | 8/2000 |
| WO | 2004/008407 | 1/2004 |
| WO | 2012/007049 | 1/2012 |
| WO | 2012/029063 | 3/2012 |
| WO | 2013/109742 | 7/2013 |
| WO | 2013/109976 | 7/2013 |
| WO | 2014/169061 | 10/2014 |
| WO | 2014/169066 | 10/2014 |
| WO | 2015/021186 | 2/2015 |
| WO | 2016160794 | 10/2016 |

OTHER PUBLICATIONS

Chu, Elbert. "Invention Awards 2014: 360-Degree Infrared Vision." Popular Science. May 5, 2014. Web. Accessed Feb. 27, 2015.
Electro Optical Industries "Spynel-M Thermal Radar for Intrusion Detection," based on information and belief, available at least as early as Mar. 7, 2018, 4 pages.
Hughes, et al., "Electromagnetic Damping in Stepping Motors," in *Proceedings of the Institution of Electrical Engineers*, vol. 122, No. 8, Published Aug. 1, 1975.
International Search Report and Written Opinion for PCT/US2016/024694 dated Jun. 24, 2016, 14 pages.
Supplemental European Search Report for 14835456.6 dated May 11, 2017, 11 pages.
Supplemental European Search Report for 14782980 completed Nov. 24, 2016.
U.S. Appl. No. 13/745,514, dated Jan. 10, 2014, Office Action.
U.S. Appl. No. 13/745,514, dated Apr. 11, 2014, Notice of Allowance.
U.S. Appl. No. 14/456,329, May 14, 2015, Restriction Requirement.
U.S. Appl. No. 14/456,329, Jan. 10, 2015, Office Action.
U.S. Appl. No. 14/652,009, Nov. 18, 2015, Office Action.
U.S. Appl. No. 14/652,006, Nov. 20, 2015, Office Action.
U.S. Appl. No. 14/456,329, Jan. 21, 2016, Notice of Allowance.
U.S. Appl. No. 14/652,006, Mar. 22, 2016, Final Office Action.
U.S. Appl. No. 14/652,009, Apr. 18, 2016, Notice of Allowance.
U.S. Appl. No. 29/523,032, Apr. 21, 2016, Office Action.
U.S. Appl. No. 14/738,391, Apr. 25, 2016, Office Action.
U.S. Appl. No. 14/652,006, Jul. 12, 2016, Office Action.
U.S. Appl. No. 29/523,032, Jul. 20, 2016, Notice of Allowance.
U.S. Appl. No. 14/738,391, Aug. 4, 2016, Notice of Allowance.
U.S. Appl. No. 14/652,006, Oct. 21, 2016, Final Office Action.
U.S. Appl. No. 14/652,006, Feb. 22, 2017, Notice of Allowance.
U.S. Appl. No. 15/159,523, Sep. 8, 2017, Office Action.
U.S. Appl. No. 15/159,523, Feb. 12, 2018, Office Action.
U.S. Appl. No. 15/159,523, Jul. 11, 2018, Notice of Allowance.
U.S. Appl. No. 15/562,798, Nov. 8, 2018, Office Action.
U.S. Appl. No. 29/669,489, filed Nov. 8, 2018, Dortch.
U.S. Appl. No. 15/562,798, dated Mar. 18, 2018, Notice of Allowance.
European Search Report for EP 19167565.1.

* cited by examiner

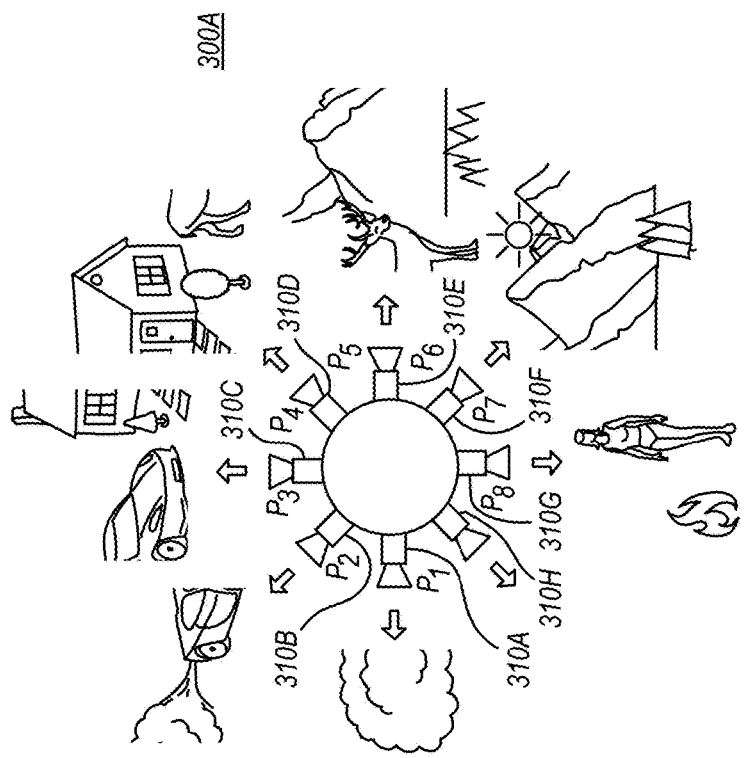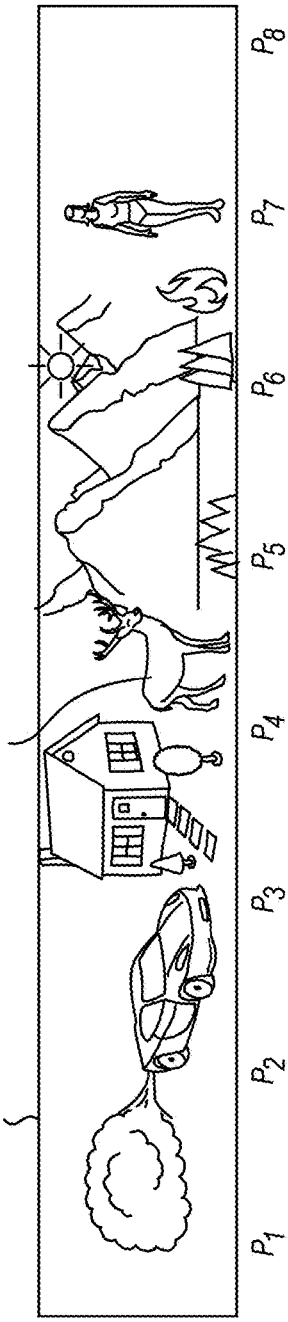
FIG. 3A
FIG. 3B

GENERATING PANORAMIC VIDEO FOR VIDEO MANAGEMENT SYSTEMS

This application claims priority to and the benefit of U.S. Provisional Application Nos. 62/580,863; 62/633,278 and 62/657,561 filed Nov. 2, 2017; Feb. 21, 2018; and Apr. 13, 2018, respectively. Each of the foregoing applications is incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

For instance, cameras and other security equipment (e.g., motion sensors, alarms, locks, lights, and so forth) may be configured to communicate with other computer systems that allow for displaying and/or interacting with such equipment. In a specific example, businesses and individuals often utilize a video management system (VMS) that can provide management of multiple security devices located on a site that the businesses or individuals may desire to monitor. Where a camera may not technically be configured to provide video image data, such existing video management systems may not be capable of accepting such image data for display.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating panoramic video viewable at a third-party video management system. For example, embodiments may include receiving image data captured by at least one camera. The received image data may be captured at a plurality of angles (e.g., stop positions) associated with a single axis (e.g., about which the camera rotates). Embodiments may optionally include analyzing the received image data and based on the received image data (and/or analysis thereof), generating panoramic video associated with the captured image data. Embodiments may further include, generating a single video stream of the generated panoramic video, and sending the single generated video stream to a third-party video management system, which it can accept for display and other use.

Accordingly, the principles described herein may allow individuals/businesses to better integrate a camera system that generates still images, rather than actual video images (for display in existing third party VMS systems), to utilize legacy equipment (and/or new equipment), while eliminating blind spots, potentially adding advanced analysis and use of images/video captured by on-site cameras, and minimizing licensing fees associated with use of video management systems, as further described herein. In particular, existing (and/or new) cameras (e.g., thermal imaging cameras, standard visible spectrum cameras, and so forth) may be placed in an array and then used to generate panoramic images that minimize and/or eliminate blind spots of a location of the cameras. In addition to generating panoramic video/images, other analyses may be performed with respect to images/video captured by such cameras that allow for determining when events (e.g., intruders, fires, and so forth) have occurred. Even where captured images (e.g., still images from a thermal camera) are not in video form, these images may be converted to a single video stream and sent as a single video stream with any other relevant data to the VMS, in any appropriate standard, thus allowing display of the video stream by the VMS. In addition, because all this data (e.g., including a virtual panoramic video image) is sent as a single video stream to the VMS, only a single licensing fee from the VMS provider is required (despite the fact that the single video stream actually includes and displays numerous virtual camera positions, as well as various other analytical data).

Such functionality may be provided in the form of an integration appliance, e.g., which receives the image data from the camera(s), corresponding to various camera positions, optionally analyzes the received data, and generates a single video stream as an output that is an acceptable input to the third party VMS system (e.g., an Real Time Streaming Protocol "RTSP" stream).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 3A illustrates an example of camera positions being placed in an array.

FIG. 3B illustrates an example panoramic image generated based on camera positions being placed in an array.

DETAILED DESCRIPTION

I. Definitions

Figure 1:
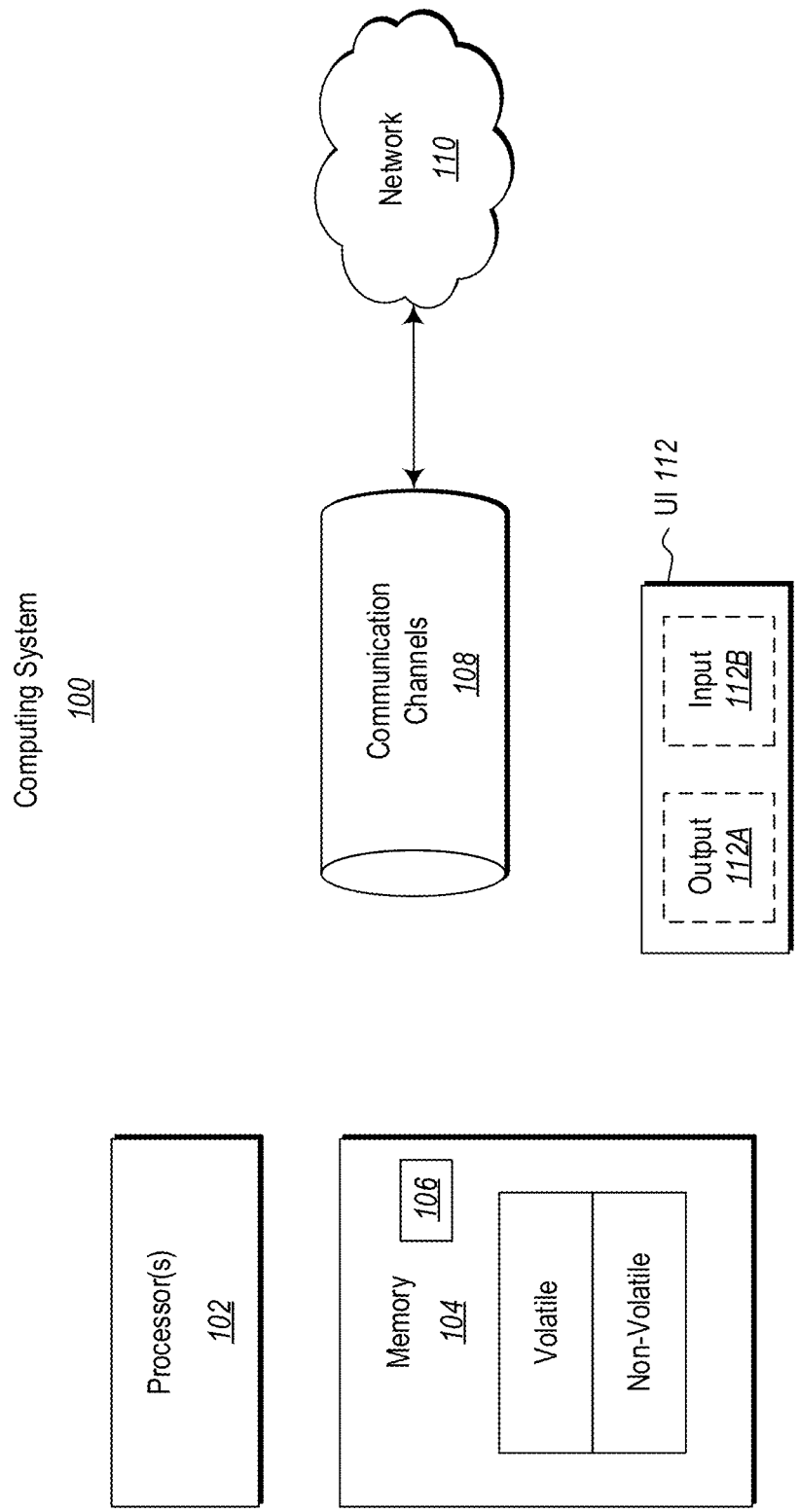
FIG. 1 illustrates an example computer architecture that facilitates operation of the principles described herein.

Before describing the present invention in detail, it is to be understood that this invention is not limited to particularly exemplified systems or parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical formulation process. Furthermore, the terms "substantially", "similarly", "about" or "approximately" as used herein represent an amount or state close to the stated amount or state that still performs a desired function or achieves a desired result.

Some ranges may be disclosed herein. Additional ranges may be defined between any values disclosed herein as being exemplary of a particular parameter. All such ranges are contemplated and within the scope of the present disclosure.

All numbers used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any measured numerical value, however, inherently contains certain errors necessarily resulting from the standard deviation found in their respective testing measurements.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

At least some embodiments described herein relate to generating panoramic video viewable at a third-party video management system (VMS). For example, embodiments may include receiving image data (non-video, still images) captured by at least one camera. The received image data may be captured at a plurality of angles associated with a single axis. For example, it may be captured by a single camera that rotates through a plurality of camera stop positions, capturing a still image at each stop position as it rotates through the stops arranged around the single axis about which the camera rotates. For example, such a single camera may be positioned above the ground (e.g., elevated 15 to 200 feet, or more typically 15 to 50 feet above the ground, e.g., on a tower so as to monitor the area (e.g., a 360° circular area) surrounding the camera position. As the camera rotates through the various stop positions, taking still images at each stop position, a virtual video surveillance can result, where the still images are displayed or otherwise analyzed sequentially (one revolution of the camera to the next). Such images may thus provide a relatively low frame rate virtual video surveillance from the single axis, at each camera stop position.

Additional details of such systems are disclosed in Applicant's previous patents and applications, e.g., including U.S. Pat. Nos. 8,773,503, 98,685,896, 9,390,604, 9,348,196, 9,516,208, 9,886,776, and application Ser. Nos. 15/159,523 and 15/562,798, each of which is herein incorporated by reference in its entirety.

While such images provide something of a virtual video surveillance, across a panorama, the frame rate from one still image to the next is typically relatively low (e.g., one every ~2 seconds), and such image data is not readily accepted for display by existing VMS systems (e.g., which require an RTSP or similar standardized video stream). The present invention provides systems and methods allowing such image data to be fed into and displayed by a conventional VMS, e.g., implemented within an integration appliance that is provided between the camera system and the VMS.

Embodiments may include receiving and optionally analyzing the received image data (e.g., non-video still images) and based on the received image data, generating virtual panoramic video associated with the captured image data. Embodiments may further include generating a single video stream of the generated "virtual" panoramic video, and sending the single generated video stream to a third-party VMS. The video stream may be usable by the VMS for displaying the generated "virtual" panoramic video. The image may actually be panoramic (rather than simply virtual panoramic, if desired). The term panoramic may be used herein for simplicity, although it will be appreciated that in at least some embodiments, the image is only virtually panoramic.

The generated and displayed panoramic video may be described as "virtual", because in at least some embodiments, no stitching of adjacent still images may actually be performed. For example, rather, the generated virtual panoramic video may simply display adjacent still images, adjacent to one another (e.g., they even may be separated from one another by a "box", making it clear with stop position is which). Because they are positioned and displayed adjacent to one another, the result is virtually that of a panorama image. In an embodiment, 180° of the panorama may be displayed in one horizontal panorama, while the remaining 180° may be displayed in another horizontal panorama. Other images and information may also be displayed in the single video stream that is generated, and fed to the VMS.

Accordingly, the principles described herein may allow individuals/businesses to integrate such a spinning thermal image surveillance camera that captures still images at a plurality of stop positions, along with legacy equipment (and/or new equipment) (e.g., pan/tilt/zoom "PTZ" cameras—typically visible spectrum PTZ cameras), while eliminating blind spots, optionally adding advanced analysis and use of images/video captured by on-site cameras, and minimizing licensing fees associated with use of video management systems, as further described herein. In particular, existing (and/or new) cameras (e.g., thermal imaging cameras, standard visible spectrum cameras, and so forth) may be placed in an array in desired locations so as to monitor the desired site, and image and other data therefrom may be collected and analyzed to generate virtual panoramic images that minimize and/or eliminate blind spots of a location of the cameras. In an embodiment, the PTZ camera may be mounted with the rotating thermal imaging camera, e.g., on substantially the same axis about which the thermal camera rotates. Such a PTZ camera may actually capture video images, rather than still images. The video of the PTZ camera can be integrated by the integration appliance into the single video feed that is fed to the VMS for display.

In addition to generating panoramic video/images, other analyses may be performed with respect to images/video captured by such cameras that allow for determining when events (e.g., intruders, fires, and so forth) have occurred. Panoramic video/images, event detection, and any other relevant data may then be sent in a single video stream to a video management system in any appropriate standard, thus allowing display of the video stream by the video management system, as well as a single licensing fee to the video management system based on only a single video stream (despite utilizing various kinds of data associated with a plurality of cameras).

Some introductory discussion of a computing system will be described with respect to FIG. 1. Then generation of panoramic video viewable at a third-party video management system will be described with respect to FIGS. 2 through 8.

III. Computing Systems

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

IV. Integration Appliances

Figure 2:
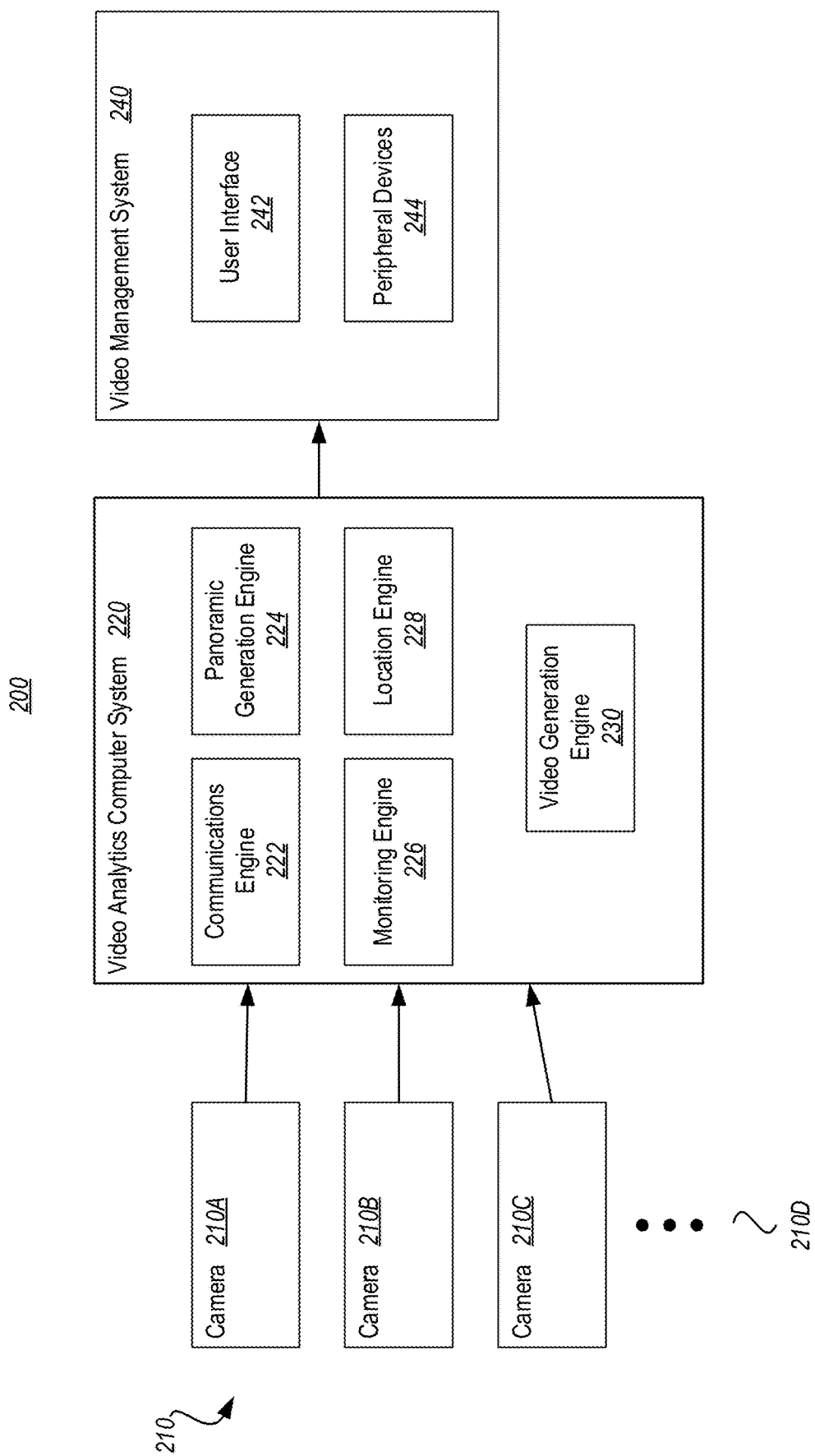
FIG. 2 illustrates an example environment for generating panoramic video viewable at a third-party video management system.

FIG. 2 illustrates an environment 200 for generating and displaying panoramic video at a third-party video management system using a plurality of camera positions 210A-210D. Video management systems (e.g., AVIGILON™, AXXONSOFT, EXCAQVISION, GENETEC™, GEOVISION, MILESTONE, and so forth) are commonly used by individuals and/or businesses to provide management and display of multiple security devices (e.g., cameras, alarms, lights, locks, and so forth), and particularly, video security devices (e.g., cameras). Such video management systems may often utilize a user interface that includes a separate video feed for each camera. The video management system may then require the individuals/businesses to pay a licensing fee for each of those video feeds (e.g., a separate licensing fee for each video feed, and ultimately, each camera or camera position).

Furthermore, many of these individuals have legacy equipment (e.g., older cameras that are already owned by an individual/business) that would be very expensive to replace, and which otherwise work fine. In addition, such legacy equipment may often be placed in various locations at a site of the individuals/businesses such that there are one or more blind spots (i.e., locations within a site that are not visible through a camera) and detection is avoidable by intruders. Accordingly, the principles described herein may allow these individuals/businesses to utilize legacy equipment, e.g., in combination with a rotating thermal image camera such as that available from Applicant, so as to better eliminate blind spots, optionally add advanced analysis and use of images/video captured by on-site cameras, and minimizing licensing fees associated with use of video management systems, as further described herein.

Returning to FIG. 2, the environment 200 includes a plurality of cameras or camera positions 210 (i.e., camera 210A through camera 210C), a video analytics computer system 220 (i.e., the integration appliance), and a video management system 240. While only three cameras or camera positions 210 are illustrated, the ellipses 210D illustrate that the environment 200 may include any number of cameras 210 or camera stop positions. In some embodiments, at least one of cameras 210 may comprise a thermal imaging camera that is capable of capturing thermal camera images from a plurality of stop positions as it rotates through the stop positions. One or more of the cameras 210 may comprise standard visible spectrum video cameras. Notably, the cameras 210 may utilize any applicable standard of video/images known by one of skill in the art. Additionally, the cameras 210 may include any combination of legacy equipment and/or new equipment acquired by an individual/business. For example, camera 210A may be a rotating thermal image camera, that captures still images through a 360° rotation positioned elevated above the ground, at a single axis in the center of a circular area being monitored. Cameras 210B and 210C may include a PTZ visible light spectrum camera. In an embodiment, at least one such PTZ camera may be positioned at substantially the same place as thermal camera 210A (i.e., elevated, at the center of the circular monitored area).

In some embodiments, such one or more cameras 210 or camera positions 210 may be placed in an array, as further shown in FIG. 3A. As illustrated in FIG. 3A, eight camera positions 310 (i.e., camera position 310A through camera position 310H) have been placed in an array that allows each camera stop position 310 to capture images at a different angle within the environment 300A. In a more particular example, the camera stop positions 310 may be oriented within the boundaries of a site/property of a business or individual such that there are no blind spots with respect to locations within the property that can be captured by the camera stop positions 310, collectively. Rotating single camera systems that rotate through a plurality of stop positions are described in the above referenced patents and applications of Applicant. Although principally described in the context of a single camera that may rotate through the plurality of stop positions 310A-310H, it will be appreciated that each stop position could instead be a separate camera (or multiple cameras could collectively rotate through the various stop positions).

Additionally, the placement or orientation of the camera stop positions 310 may also allow for later stitching of captured images/video to generate panoramic images/video utilizing captured image data from each of the camera stop positions 310.

As illustrated, the environment 200 also includes a video analytics computer system 220 (i.e., the integration appliance) that may be capable of performing various analytics and enhancements (e.g., stitching together or adjacent positioning of multiple captured camera still images into a panoramic or "virtual" panoramic image) System 220 is also capable of generating a single video stream from the input data, and transmitting video, images, and associated user interface(s) to the video management system 240, all as a single video stream, as further described herein. The video analytics computer system may correspond to the computer system 100, as described with respect to FIG. 1. The video analytics computer system 220 may comprise any type of computer system, including any combination of hardware and/or software that is configured to stitch images received from one or more cameras into a panoramic image, as further described herein.

As shown, the video analytics computer system 220 may include various engines, functional blocks, and components, including communications engine 222, panoramic generation engine 224, monitoring engine 226, location engine 228, and video generation engine 230. The various engines, components, and/or functional blocks of the step length analysis computer system 220 may be implemented on a local computer system or may be implemented on a distributed computer system that includes elements resident in the cloud or that implement aspects of cloud computing (i.e., at least one of the various illustrated engines may be implemented locally, while at least one other engine may be implemented remotely). In addition, the various engines, functional blocks, and/or components of the video analytics computer system 220 may be implemented as software, hardware, or a combination of software and hardware.

Notably, the configuration of video analytics computer system 220 illustrated in FIG. 2 is shown only for exemplary purposes. As such, the video analytics computer system 220 may include more or less than the engines, functional blocks, and/or components illustrated in FIG. 2. Although not illustrated, the various engines of the video analytics computer system 220 may access and/or utilize a processor and memory, such as the processor 102 and the memory 104 of FIG. 1, as needed to perform their various functions.

As illustrated, the video analytics computer system 220 includes communications engine 222, panoramic generation engine 224, monitoring engine 226, location engine 228, and video generation engine 230. The communications engine 220 may be configured to communicate (i.e., transmit and/or received data) with both the cameras 210 and the video managements system 240. For instance, the communications engine 222 may be configured to receive captured images (e.g., thermal camera still images) from the camera that rotates through a plurality of camera positions (e.g., 210A), as well as other cameras of 210 (e.g., a PTZ camera 210B). Additionally, the communications engine 222 may be capable of sending various types of data (e.g., video data, alarm data, intruder detection data, and so forth) to the video management system 240, as further described herein. Notably, in some embodiments, the communications engine 222 may also be configured to receive various types of data from the video management system 240.

The panoramic generation engine 224 may be configured to receive images captured by the cameras 210 and generate a panoramic image based on still images captured by the rotating thermal imaging camera. In addition, it may also integrate other camera feeds into the generated single video stream (e.g., displaying the PTZ camera feed with the generated virtual panorama). FIG. 3B illustrates a specific example of generating a panoramic image based on images/video captured by the cameras 310. As shown in FIG. 3A, camera 310A through camera 310H (or camera stop positions 310A-310H where 310 is just a single camera) have been placed within positions P1 through P8, respectively.

Images captured by each of the cameras 310 within positions P1 through P8 may then be sent to the video analytics computer system 220, and ultimately the panoramic generation engine 224. The panoramic generation engine 224 may then analyze the received images and stitch or adjacently arrange the received images from each of the cameras or camera positions 310 to generate the panoramic image or video 300B.

The monitoring engine 226 may be configured to detect any intruders or changes that occur with respect to images captured by any of the plurality of cameras 210. For instance, the monitoring engine 226 may perform advanced analytics on images (e.g., sequential still images) provided by the cameras 210 and/or the panoramic generation engine 224 to provide intrusion detection (e.g., unauthorized individuals trespassing), animal migration, heat change detection, fire detection, drone detection, unauthorized movement in water ways, tripwire detection, and so forth.

Furthermore, the monitoring engine 226 may encode any applicable alerts associated with various detected events (e.g., intrusion detection, fire detection, and so forth) into any appropriate format (e.g., ONVIF) that is usable by the video management system 240. In some embodiments, such alerts may be sent to the video management system 240 over Hypertext Transfer Protocol (HTTP). In response to receiving such alerts from the monitoring engine 226 (and ultimately, the video analytics computer system 220), the video management system 240 may trigger any corresponding alarms, as further described herein.

Figure 4:
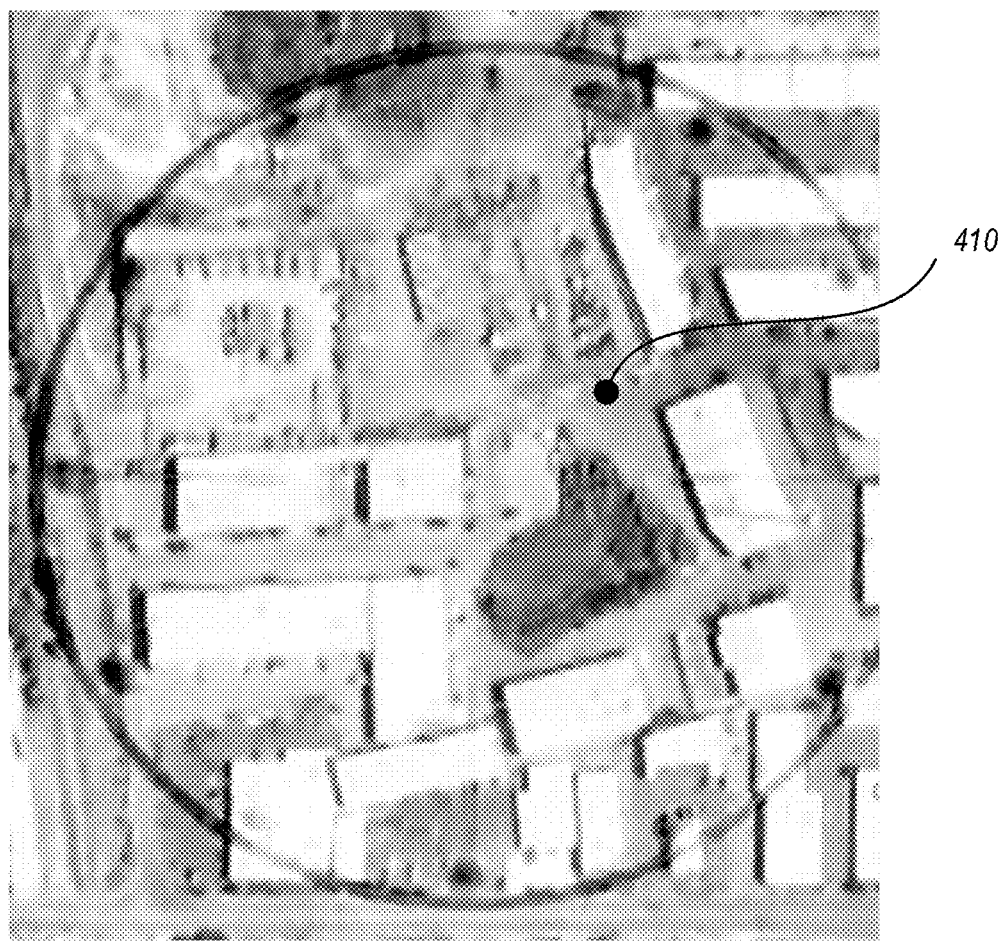
FIG. 4 illustrates an example of a map image generated for displaying detected events at a site monitored by one or more cameras.

The location engine 228 may be configured to utilize data detected by the monitoring engine 226 to generate location information associated with detected entities. For instance, upon detecting an event, the location engine may generate an image (e.g., a map image) that illustrates a location of the detected event within a map of the location of the cameras 210. For instance, FIG. 4 illustrates a map 400 of a circular monitored area, with highlighting of an area associated with a detected event. In particular, FIG. 4 includes a point 410 that corresponds to the location of a detected event (e.g., a detected intruder, a detected fire, motion and so forth).

In an example, one or more of the cameras 210 or other system components on site with the camera may include a Global Positioning System (GPS) device that may allow for determining a position of a detected event that can be used to plot points on a map associated with a location of the detected event. Notably, in some embodiments, such a map may include a "radar" with a sweeping mechanism that includes a line traveling from the center of the map (where the rotating thermal image camera is located) to the perimeter of the map in a clockwise or counter-clockwise direction (i.e., similar to the second hand of a watch). Such a sweeping line may indicate at which stop position the camera is currently pointed. Where the system also includes a conventional PTZ camera, the system may be configured to cause the PTZ camera to automatically move so as to be centered on and monitor the location where any detected event has occurred. The PTZ camera feed may be integrated into the single video stream output by the integration appliance. Additionally, the map may provide zoom capabilities that allow an individual to zoom-in or zoom-out of the map, or of course to zoom in with the PTZ camera. In this way, the location engine 228 may provide a scalable bird's eye display that shows activity surrounding the cameras 210. Panorama or virtual panorama images may be displayed with such a birds eye view map (e.g., 180° above, and 180° below, as in FIG. 5), and with any PTZ camera feed as well. All such portions of the displayed image may be fed to the VMS as a single video feed.

Figure 5:
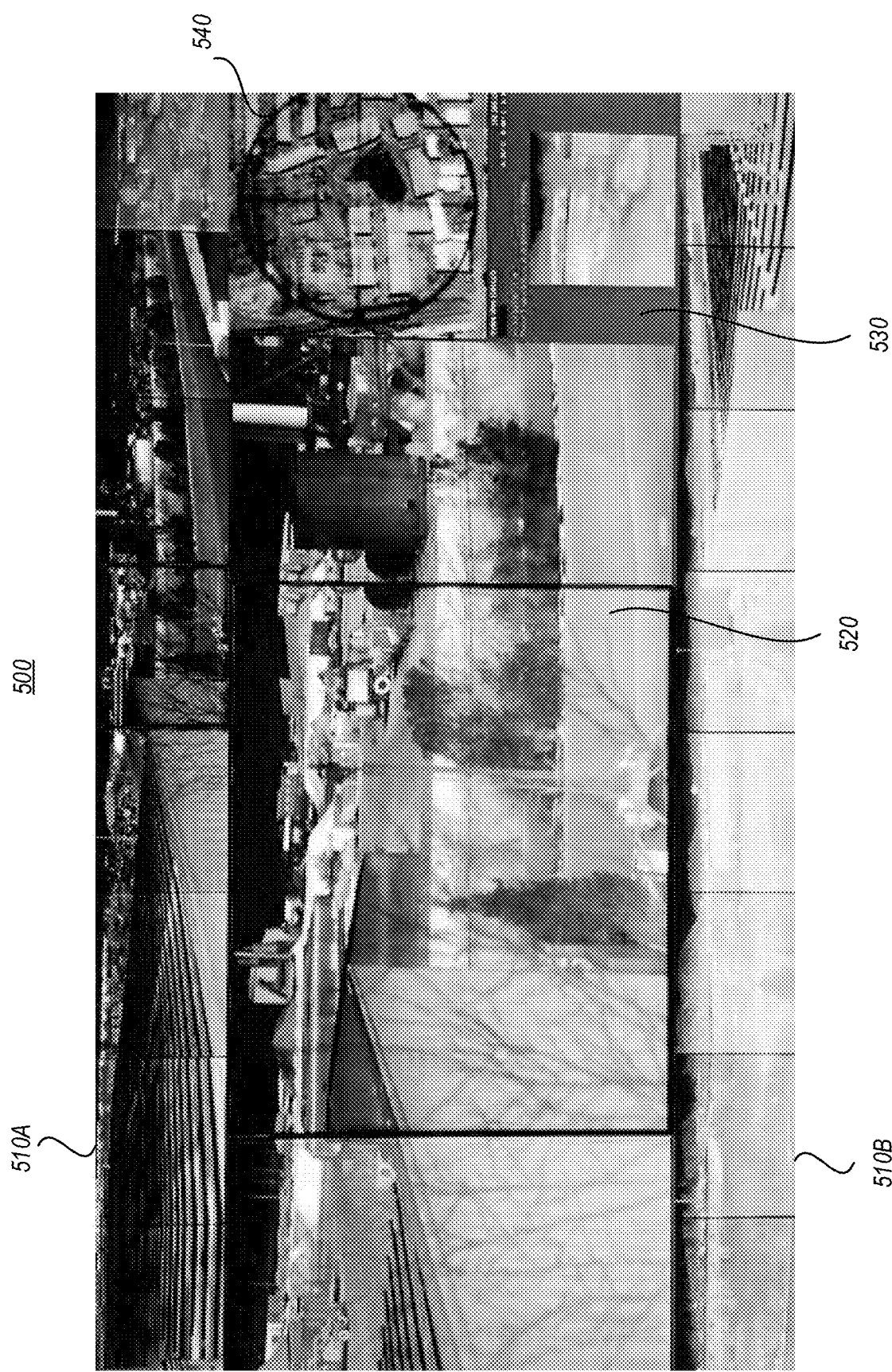
FIG. 5 illustrates an example single video stream generated by the integration appliance for display at a conventional video management system.

The video generation engine 230 may be configured to generate a video stream that both includes one or more of virtual panoramic video images, event detection, maps, PTZ camera feed, and so forth, and is usable by the video management system 240, as further described herein. For instance, as illustrated in FIG. 5, a single video stream may 500 include a top portion 510A that comprises a plurality of images that each correlate to one of the plurality of camera positions (e.g., the camera positions 210 or 310) and have been displayed adjacent to one another or stitched together to form at least a portion of a panoramic image or video. For example, where each of the 8 camera positions seen in top portion 510A is updated every 2 seconds (as the camera rotates around a single revolution), the image displayed in that corresponding "window" of top portion 510A may be updated. Alternatively, the entire horizontal row of top portion images 510A may all be updated simultaneously. The video stream 500 also includes a bottom portion 510B that comprises another plurality of images that correlate to another plurality of camera stop positions and have been positioned and displayed adjacent to one another or stitched together to form at least a portion of a panoramic video/image. Notably, in some embodiments, the top portion 510A and the bottom portion 510B may each comprise a portion of a panoramic video/image that could be further stitched together to form a single panoramic video/image that includes all of top portion 510A and bottom portion 510B. In the illustrated embodiment, the top portion 510A represents positions 1-8 of the rotating thermal camera, while the bottom portion 510B represents positions 9-16 of the same camera (i.e., each portion covers 180° of the overall 360° panorama that is monitored, which will be apparent from the circular monitored area of FIG. 4).

As illustrated, the video stream 500 further includes a middle portion 520 that is configured to show a view illustrated with a particular camera of the plurality of cameras providing the images associated with portion 510A and portion 510B (or another camera entirely—e.g., a separate PTZ visible spectrum "color" camera). In some embodiments, the portion 520 may periodically cycle through captured video/images of each camera providing captured video/images, or it may highlight an area where some event (e.g., an intruder) has been detected. Video portion 530 may focus on captured video/images associated with detected events and may further describe the event with text (e.g., type of event and location of the event). Notably, the portion 520 and/or the view 530 may each periodically cycle through captured video/images of each of the plurality of cameras or camera positions (e.g., the camera positions 310) or may focus on areas where events have been detected (e.g., intruders, fire, and so forth). FIG. 5 also includes a portion 540 that illustrates a birds eye map/"radar" view illustrating a birds eye view of the circular monitored area. This portion may include map, "radar", and location data, as further described with respect to FIG. 4. Notably, while a particular layout of the video stream 500 is illustrated herein, essentially unlimited numbers of possibilities associated with layouts of the video stream 500 practicing the principles described herein (e.g., splitting a panoramic image/video into any number of smaller panoramic video/image portions), inclusion of a birds eye view, e.g., with a "radar" sweep, inclusion of a window or portion that shows a PTZ view, etc.

Accordingly, the video generation engine 230 may also encode such video/images (e.g., video stream 500), any other information generated by the video analytics computer system, into a single video stream using any appropriate standard. In an example, the video generation engine may encode still image or video data (e.g., panoramic image data generated by the panoramic generation engine, map/location data generated by the location engine, and so forth) into a single Real Time Streaming Protocol (RTSP) video stream that is usable by the video management system 240 for presenting the video stream. In some embodiments, the video generation engine queues up each frame of video into a video rendering stack. The video rendering stack may then allow for encoding the frame one or more times as part of a continuous video stream using a standard codec (e.g., MP4, H.264, and so forth). The frame may then be repeated in order to meet any corresponding frame rate utilized by the video management system 240 (e.g., such as 30 fps, 60 fps, or the like).

As briefly described, video management systems (e.g., AVIGILON, AXXONSOFT, EXCAQVISION, GENETEC, GEOVISION, MILESTONE, and so forth) are commonly used to provide management of multiple video security devices (e.g., video cameras, alarms, motion sensors, lights, locks, and so forth). As such, video management systems may include a user interface 242 that shows video associated with each of a plurality of video cameras fed to such VMS, for example.

Figure 6:
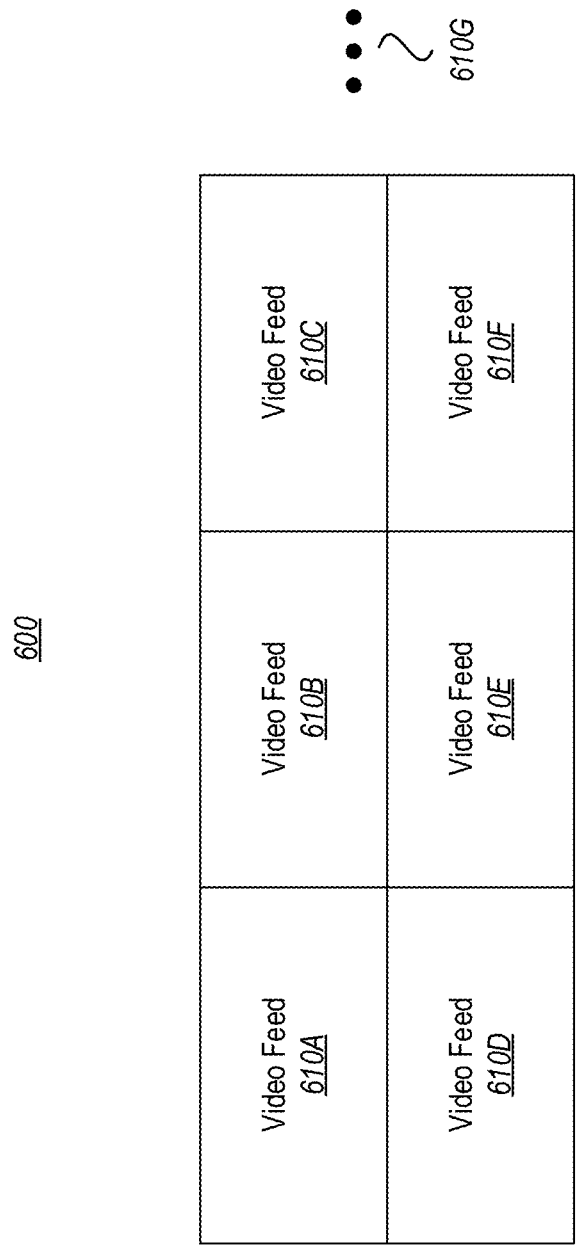
FIG. 6 illustrates an example video management system user interface for viewing images (virtual video) captured by a plurality of camera positions.

FIG. 6 illustrates a more specific example of a user interface 600 of a typical VMS. As illustrated, FIG. 6 includes six different video feeds (i.e., video feed 610A through video feed 610F) that may each be associated with a different camera (e.g., the video feed 610A is associated with video captured by a single video camera, the video feed 610B is associated with video captured by another video camera, and so forth). Notably, while six video feeds 610 are illustrated, the ellipses 610G represents that the principles described herein may utilize any number of video feeds for display on a given monitor or array of monitors.

As illustrated, the video management system 240 may also include peripheral devices 244. For instance, such peripheral devices may include additional cameras or types of cameras (e.g., visible spectrum "color" cameras capable of facial recognition, thermal imaging cameras, and so forth), motion detectors, lights, locks, and so forth. The video management system may further be configured to utilize these devices and allow control thereof in conjunction with each other by locking doors/gates, turning on/off lights, turning on/off alarms, and so forth in response to detecting particular events (e.g., detecting motion).

Figure 7:
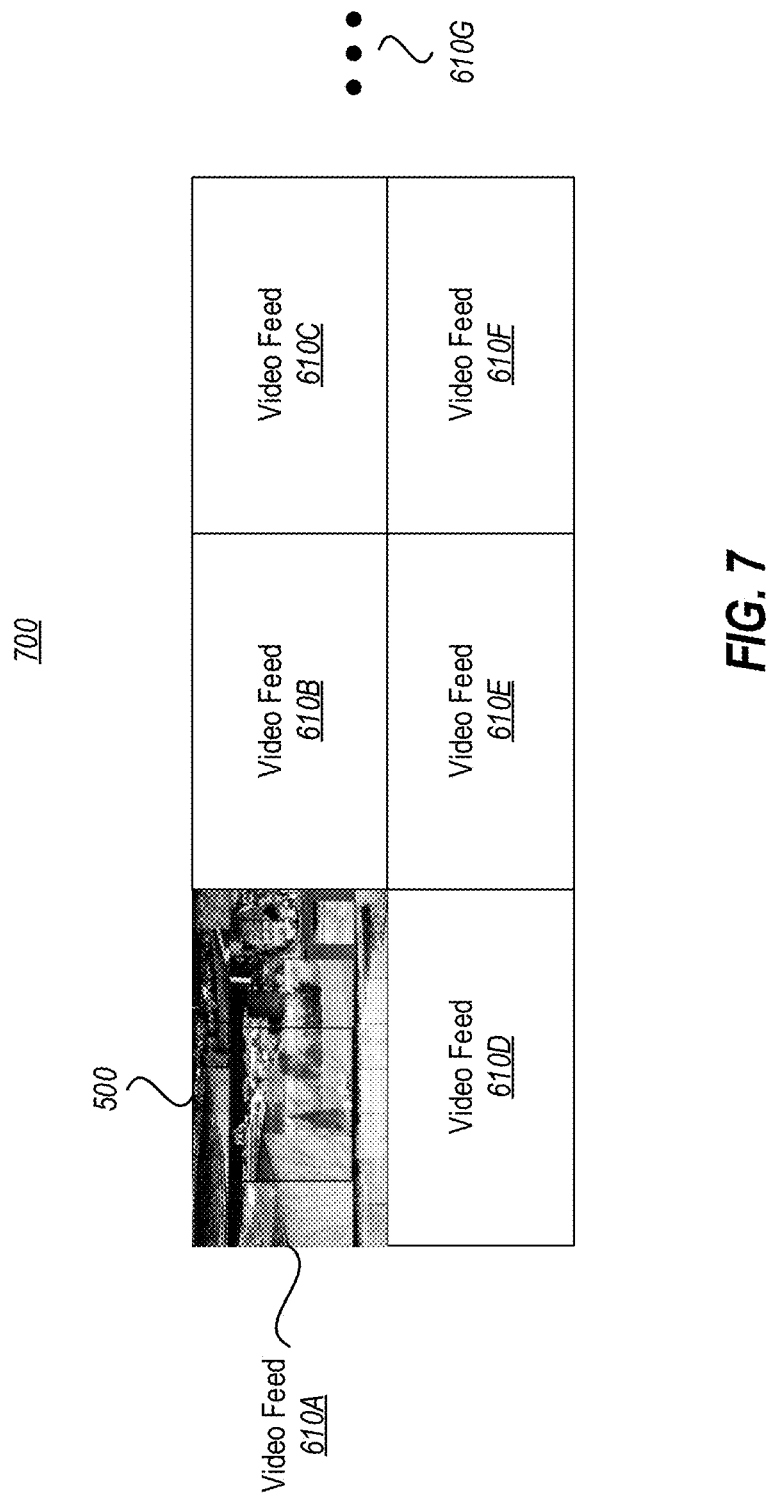
FIG. 7 illustrates an example of a video management system displaying a generated panoramic video stream at a user interface of the video management system.

Notably, the video analytics computer system 220 may be configured to add additional functionality to the cameras, user interface, and other peripheral devices of the video management system 240. For instance, regardless of the layout of the video stream 500, the video stream 500 may be provided as a video stream (i.e., as further described with respect to the video generation engine 230 of FIG. 2) to the video management system 240, as illustrated in FIG. 7. As shown in FIG. 7, the video feed 610A of the video management system 240 may be utilized to display the video stream 500 of FIG. 5. Notably, as described above, this single video stream includes far more data and information than a single camera feed. For example, it includes panoramic images, the birds eye view, "radar" sweep, feed from a separate PTZ camera, alert information relative to a detected intruder or other event, etc. All this is provided as a single video feed, using only one of the licenses available within the VMS.

Notably, while the video stream 500 is shown as being displayed within the video feed 610A of the video management system 240, the video stream 500 may be displayed within any given video feed 610 of the video management system. Additionally, while only one video stream is illustrated in FIG. 7 as being sent to, and displayed by, the video management system, any number of video streams may be sent by the video analytics computer system 220 to the video management system 240.

In addition to the video stream 500, the video analytics computer system 220 may also send any other applicable data and/or metadata to the video management system 240. For instance, alert data using any applicable standard may be sent to the video management system. The video management system may then have rules in place associated with a response to receiving such data (e.g., sound an alarm, turn on/off particular lights, lock/unlock particular doors or gates, and so forth). In another example, the video analytics engine may send location information associated with detected events, event information associated with particular types (e.g., intruder, fire, and so forth) of events, and so forth. Such information may be displayed within the single video feed associated with "window" 610A, or in another "window" (610B-610F).

The video analytics computer system may further be configured to communicate directly with any number of peripheral devices (e.g., cameras, alarms, lights, motion detector, locks, and so forth). In an example, the video analytics computer system may communicate directly with a PTZ camera in a particular location when an event in the particular location has been detected by the video analytics computer system. In such cases, the video analytics computer system may then communicate to the PTZ camera where the event is occurring such that the PTZ camera can pan, tilt, or zoom in a proper direction to be able to capture images/video (and/or perform any other analysis, such as facial recognition) associated with the detected event. Similar communications may be sent directly to particular alarms, lights, locks, and so forth, such that these peripheral devices may be fully utilized in response to a detected event.

Notably, a hardware portion of the video analytics computer system may support hardware encoding of video streams, as well as expansion slots to allow additional video encoding hardware to be added to support multiple video streams. In some embodiments, such video stream may comprise a 1080 resolution video wall in H.264 format. The hardware portion of the video analytics computer system may also include an ONVIF front end to facilitate discovering and adding the hardware portion of the video analytics computer system to an ONVIF-compliant video management system. In addition, the hardware portion of the video analytics computer system may provide a Hypertext Markup Language (HTML) interface that allows a user to configure/modify a layout of the video stream (e.g., the video stream 500) to be displayed at the video management system 240, types of data and metadata sent to the video management system, types of alarm/event detection data sent to the video management system, and so forth. the hardware portion of the video analytics computer system may provide another Hypertext Markup Language (HTML) interface that allows a user to add additional cameras (e.g., additional cameras to the cameras 210 or the cameras 310) that can then be used in providing panoramic images, event detection, and so forth. Accordingly, the video analytics computer system may provide a ready to install deployment of software and hardware with support for common video protocols and common video management systems.

Figure 8:
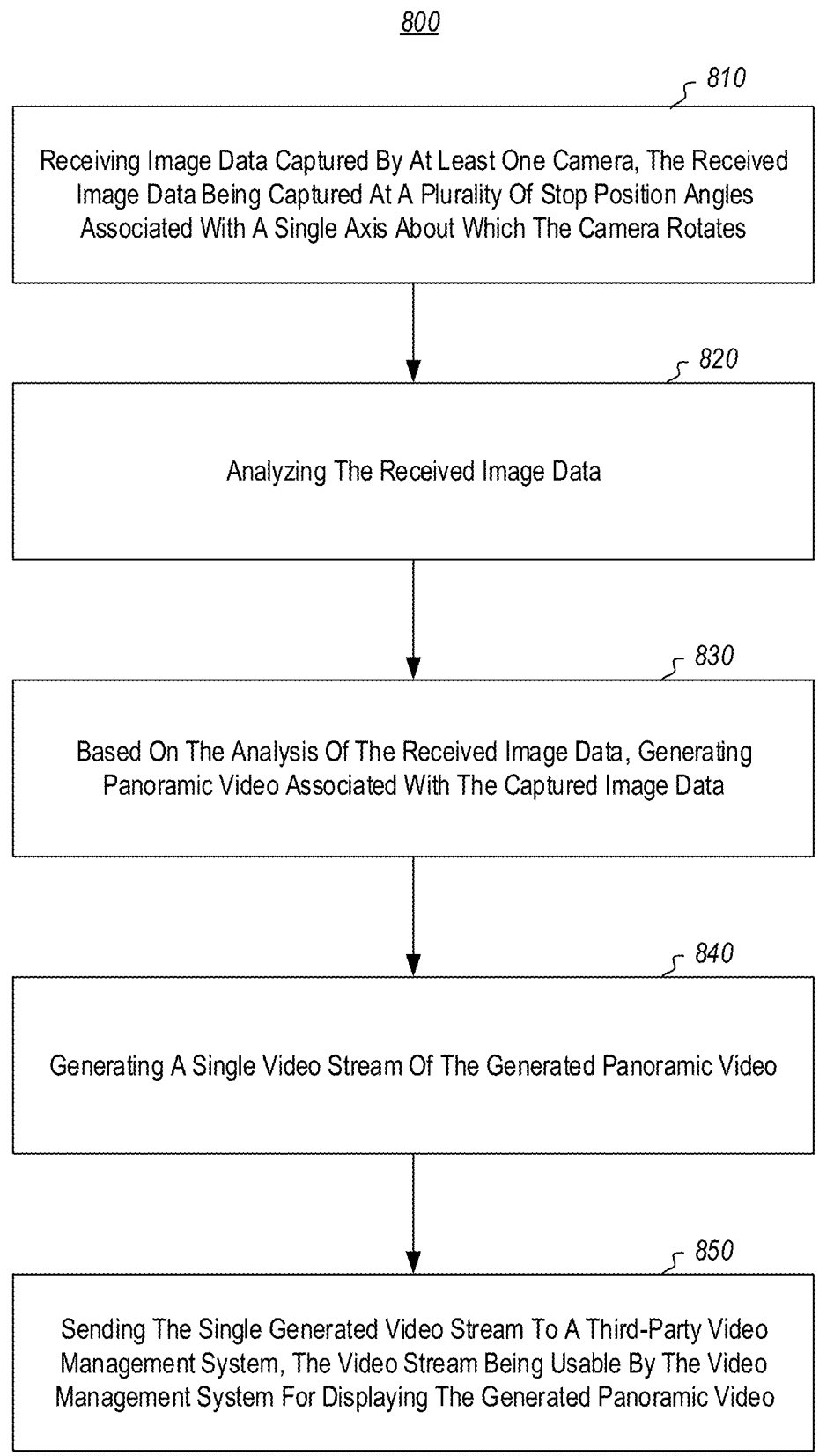
FIG. 8 illustrates a flowchart of a method for generating panoramic video as a single video stream, viewable at a third-party video management system.

FIG. 8 illustrates a flowchart of a method 800 for generating panoramic video viewable at a third-party video management system. The method 800 is described with frequent reference to the environments of FIGS. 2-6. The method 800 includes, receiving image data captured by at least one camera, the received video data being captured at a plurality of angles (e.g., stop positions) associated with a single axis (act 810), about which the camera may rotate. For example, the camera stop positions 310 of FIG. 3 may be placed in an array capturing "inside-out" still images surveillance of a circular monitored area, which still images are received by the video analytics computer system 220.

The method 800 may further include, analyzing the received image data (act 820). For example, the video analytics computer system 220 may analyze the received video/images from the camera(s) for identifying the occurrence of events, determining how to position adjacent images together, or to stitch images from adjacent stop positions together into panoramic video/images, and so forth. Whether or not any analytics are provided, the method 800 includes generating panoramic video associated with the captured image data (act 830). For instance, the video analytics computer system 220 may use the received video/images and/or analysis thereof to generate panoramic video/images, as illustrated by the panoramic image of FIG. 3B.

The method 800 further includes, generating a single video stream of the generated panoramic video (act 840). For instance, the video analytics computer system 220 may generate a single video stream that includes the generated panoramic video, as well as various data, images, and/or video related to detected events. The method 800 also includes sending the single generated video stream to a third-party video management system (act 850). Notably, the video stream may be usable by the video management system for displaying the generated panoramic video. For instance, the single video stream may include video/images and data from each of the plurality of cameras or camera positions, which video/images (and data) may be shown at the user interface 242 of the video management system, as further described with respect to FIGS. 5, 6 and 7.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Features described in any given embodiment, or claim, may be combined with features described in any other embodiment, or claim.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processor(s); and
   one or more computer-readable hardware storage device(s) having stored thereon computer-executable instructions that are executable by the one or more processor(s) to cause the computer system to generate a panoramic video viewable at a third-party video management system by causing the computer system to perform at least the following:
   receive image data captured by at least one camera, the received image data being captured at a plurality of angles or stop positions associated with a single axis;
   based on the received image data, generate the panoramic video;
   generate a single video stream including the generated panoramic video, wherein:
     the generated panoramic video is split within the single video stream into at least a first portion and a second portion, the first portion and the second portion being configured for display as separate horizontal panoramas,
     the horizontal panorama of the first portion comprises images that each correlate to a separate one of the plurality of angles or stop positions, and
     a number of the images in the horizontal panorama of the first portion is half of a number of angles or stop positions included in the plurality of angles or stop positions; and
   send the single video stream to the third-party video management system, the single video stream being usable by the third-party video management system for displaying the generated panoramic video.

2. The computer system in accordance with claim 1, wherein the received image data is received from a plurality of different cameras.

3. The computer system in accordance with claim 1, wherein the at least one camera comprises a single camera that is configured to rotate about the single axis and capture still images, rather than video, at a plurality of stop positions throughout the rotation of the camera.

4. The computer system in accordance with claim 1, wherein the at least one camera comprises a thermal camera that is configured to capture thermal camera images.

5. The computer system in accordance with claim 1, wherein execution of the computer-executable instructions further causes the computer system to analyze the received image data, and wherein analyzing the received image data includes detecting when one or more event(s) have occurred at a site monitored by the at least one camera.

6. The computer system in accordance with claim 5, wherein analyzing the received image data further includes determining a particular location of the one or more event(s) within the site monitored by the at least one camera.

7. The computer system in accordance with claim 6, wherein the sent video stream includes data associated with the determined particular location of the one or more event(s).

8. A method, implemented at a computer system that includes one or more processor(s), for generating a panoramic video viewable at a third-party video management system, said method comprising:
   receiving still image data captured by at least one camera, the received still image data being captured at a plurality of stop positions associated with a single axis about which the at least one camera rotates;
   based on the received image data, generating the panoramic video;
   generating a single video stream of the generated panoramic video, wherein:
     the generated panoramic video is split within the single video stream into at least a first portion and a second portion, the first portion and the second portion being configured for display as separate horizontal panoramas, the horizontal panorama of the first portion comprises images that each correlate to a separate one of the plurality of angles or stop positions, and a number of the images in the horizontal panorama of the first portion is half of a number of angles or stop positions included in the plurality of angles or stop positions; and sending the single video stream to the third-party video management system, the single video stream being usable by the third-party video management system for displaying the generated panoramic video.

9. The method in accordance with claim 8, wherein the received image data is received from a plurality of different cameras including both a thermal image camera that captures still images at a plurality of stop positions as it rotates through a plurality of such stop positions, about the single axis, and wherein the plurality of different cameras also includes a pan-tilt-zoom (PTZ) visible light spectrum camera which captures video image data.

10. The method in accordance with claim 9, wherein the PTZ camera and the thermal camera are located at the center of a circular area monitored by the thermal camera, the single axis being at the center of the monitored circular area.

11. The method in accordance with claim 8, wherein the at least one camera comprises a single camera that is configured to rotate about the single axis and capture still images at a plurality of stop positions throughout the rotation.

12. The method in accordance with claim 8, wherein the method further includes analyzing the received image data, wherein analyzing the received image data includes detecting when one or more event(s) have occurred at a site monitored by the at least one camera.

13. The method in accordance with claim 12, wherein analyzing the received video data further includes determining a particular location of the one or more event(s) within the site of the at least one camera.

14. The method in accordance with claim 13, wherein the sent video stream includes data associated with the determined particular location of the one or more event(s).

15. One or more hardware storage device(s) having stored thereon computer-executable instructions that are executable by one or more processor(s) of a computer system to cause the computer system to generate a panoramic video viewable at a third-party video management system from still images, rather than video images, by causing the computer system to perform at least the following:

receive still image data captured by at least one camera, the received still image data being captured at a plurality of angles or stop positions associated with a single axis about which the at least one camera rotates;

based on the received still image data, generate the panoramic video;

generate a single video stream comprising the generated panoramic video, wherein:

the generated panoramic video is split within the single video stream into at least a first portion and a second portion, the first portion and the second portion being configured for display as separate horizontal panoramas, the horizontal panorama of the first portion comprises images that each correlate to a separate one of the plurality of angles or stop positions, and a number of the images in the horizontal panorama of the first portion is half of a number of angles or stop positions included in the plurality of angles or stop positions send the single video stream to the third-party video management system, the single video stream being usable by the video management system for displaying the generated panoramic video.

16. The one or more hardware storage device(s) of claim 15, wherein the received image data is received from a plurality of different cameras, or from a thermal imaging camera that is configured to capture thermal camera images as it rotates through the plurality of stop positions.

17. The one or more hardware storage device(s) of claim 15, wherein execution of the computer-executable instructions further causes the computer system to analyze the received still image data, wherein analyzing the received still image data includes detecting when one or more event(s) have occurred at a site monitored by the at least one camera, and determining a particular location of the one or more event(s) within the site monitored by the at least one camera.

18. The one or more hardware storage device(s) of claim 17, wherein the sent video stream includes data associated with the determined particular location of the one or more event(s).

19. The one or more hardware storage device(s) of claim 15, wherein the sent video stream is derived in part from a thermal imaging camera at a center of a circular monitored area, wherein the sent single video stream also includes an embedded video from a pant-tilt-zoom (PTZ) camera that is also located at a center of the circular monitored area.

20. The one or more hardware storage device(s) of claim 15, wherein the sent video stream is derived in part from a thermal imaging camera at a center of a circular monitored area, and wherein:

(i) the sent video stream also includes a bird's eye view that provides a bird's eye map view of the circular monitored area; or (ii) the sent video stream splits a 360° panorama monitored by the rotating thermal imaging camera into two 180° portions of the panorama, the first portion being a first one of the 180° portions and the second portion being a second one of the 180° portions, each of the two 180° panorama portions being displayed as separate horizontal panoramas, one above the other; or (iii) both (i) and (ii).

* * * * *